T. Royer,
Fly Net,
Nº 57,384. Patented Aug. 21, 1866.
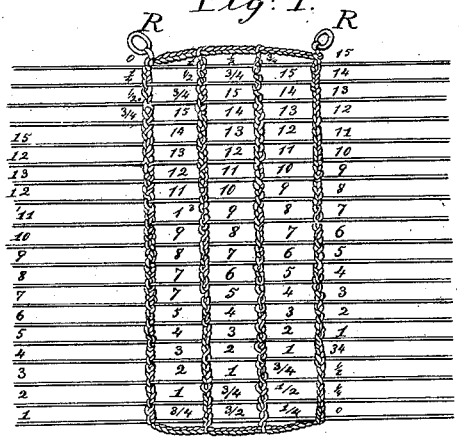
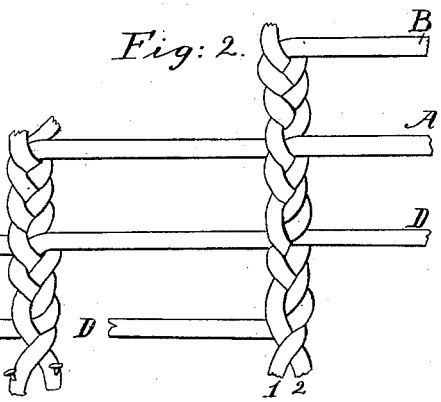
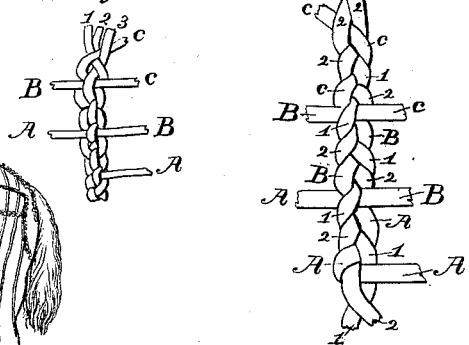
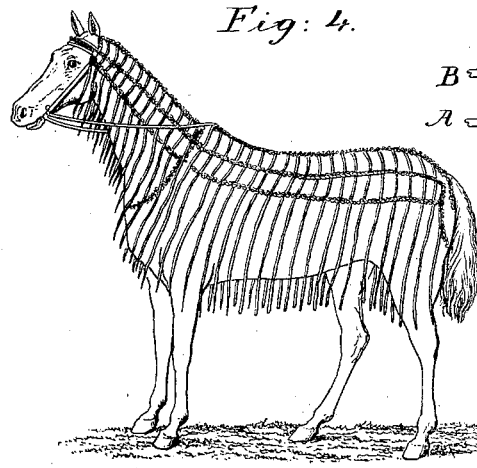
Witnesses;
Cha. R. Frailey
Jacob Stauffer
Inventor;
Tobias Royer

UNITED STATES PATENT OFFICE.

TOBIAS ROYER, OF LANCASTER, PENNSYLVANIA.

IMPROVEMENT IN FLY-FLAPS.

Specification forming part of Letters Patent No. 57,384, dated August 21, 1866.

*To all whom it may concern:*

Be it known that I, TOBIAS ROYER, of Lancaster, in the county of Lancaster and State of Pennsylvania, have invented a new and Improved Mode for Constructing Coverings to Protect Horses against or from the Annoyance of Flies, commonly called "Fly-Nets" or "Fly-Flaps;" and I do hereby declare that the following is a full and exact description thereof, reference being had to the accompanying drawings, making a part of this specification, in which—

Figure 1 is a view of the interwoven strands forming my plaited fly-flap. Figs. 2 and 3 illustrate the manner of plaiting; Fig. 4, on the horse.

The nature of my invention consists, simply, in plaiting the horizontal cross-strands into and with the longitudinal strands, instead of using slits or holes punched through said longitudinal straps or strands. These are found liable to slip, even when cut so as to enter obliquely, unless the slits are so small as to render it a tedious business to slip the flat or rounded leather through them, requiring more time to do so than the plaiting, which takes but very little more leather, and I find I can make them much faster and with less perplexity than by any of the other methods heretofore in use among saddlers; and while they can be made ornamental, the plain braiding is very neat, strong, and the strands cannot slip, and both the novelty and utility of this mode of manufacture meets with favor among saddlers and the public generally.

After various trials and experiments in order to perfect my idea, I have succeeded in bringing it to a practical utility, readily understood by a single lesson or the study of my diagram, to accompany the sale of my invention.

To enable others skilled in the art to make and use my invention, I will proceed to describe the method I have adopted and manner of plaiting, which, however simple when seen, and after some practice expeditiously executed, it is more difficult to explain in words without reference to the diagrams.

The longitudinal strands or straps 1 2 are usually in pairs, and about nine inches apart and about five feet long, one end of the pair either left united or both held by a tack on the table. The flattened or rounded leather strips—say six feet long—being at hand, (the end ones are usually shorter,) I commence with 1, (call it A,) at a point, say, twenty-two inches from one end, introduce it between the longitudinal straps 1 2, and plait it with them, as shown by the letters and figures, and pass it out on the opposite side to that on which I commenced. The remaining portion of strap A may now remain, and the strap B introduced and interwoven in like manner, and so on to the number of fifteen, (more or less,) as shown in Fig. 1 by the alternate red and blue strands, the strands advancing forward on being plaited into the next parallel longitudinal strands, of which four are shown in said figure. (It is the same whether three or five are used, in principle.) Thus it will be seen that the first strand, A, or No. 1, has advanced four points, which leaves four shorter pieces (marked $\frac{3}{4}$, $\frac{1}{2}$, $\frac{1}{4}$, and 0) to be plaited into the cross plaits or braids uniting the hind and front ends of the longitudinal braces or braids; and as No. 15 runs out at the other end on the side opposite, there will be four spaces to be supplied by the shorter pieces $\frac{3}{4}$, $\frac{1}{2}$, $\frac{1}{4}$, and 0, in like manner.

The rings R are secured at the forward corners of the outer longitudinal braids, and can be introduced at other desirable points.

The neck and head flaps are usually made separate, simply by bringing the longitudinal strips to approximate and shortening the strands to the required length of the parts employed.

I find I can also plait with three longitudinal strands, which, for cord-work or small rounded leather cording, answers well; but being more tedious, without a corresponding benefit, I simply mention and illustrate by Fig. 3 as being a part of the result of my experimenting.

I am not aware that "fly-nets," as they are commonly called, or fly-flaps, have ever been made by plaiting the horizontal into or with the longitudinal straps or cords. I am aware that there is no special novelty in the plaiting, independently considered; but, when applied in the manufacture of fly-flaps, it introduces a new mode to the trade. Whether these flaps are made from leather or other material, flat or round, and plaited or braided, substantially in the manner specified, I deem as my introduction and discovery. Therefore,

What I claim as my invention, and desire to secure by Letters Patent, is—

The manufacture of fly flaps or nets, when made by plaiting or braiding the horizontal and longitudinal cords or bands with or into each other, substantially in the manner specified and shown.

TOBIAS ROYER.

Witnesses:
 CHAS. R. FRAILEY,
 JACOB STAUFFER.